June 21, 1927.
S. G. VAN DERBECK ET AL
1,633,540
AERIAL ILLUMINATING DEVICE
Filed July 31, 1923      2 Sheets-Sheet 2
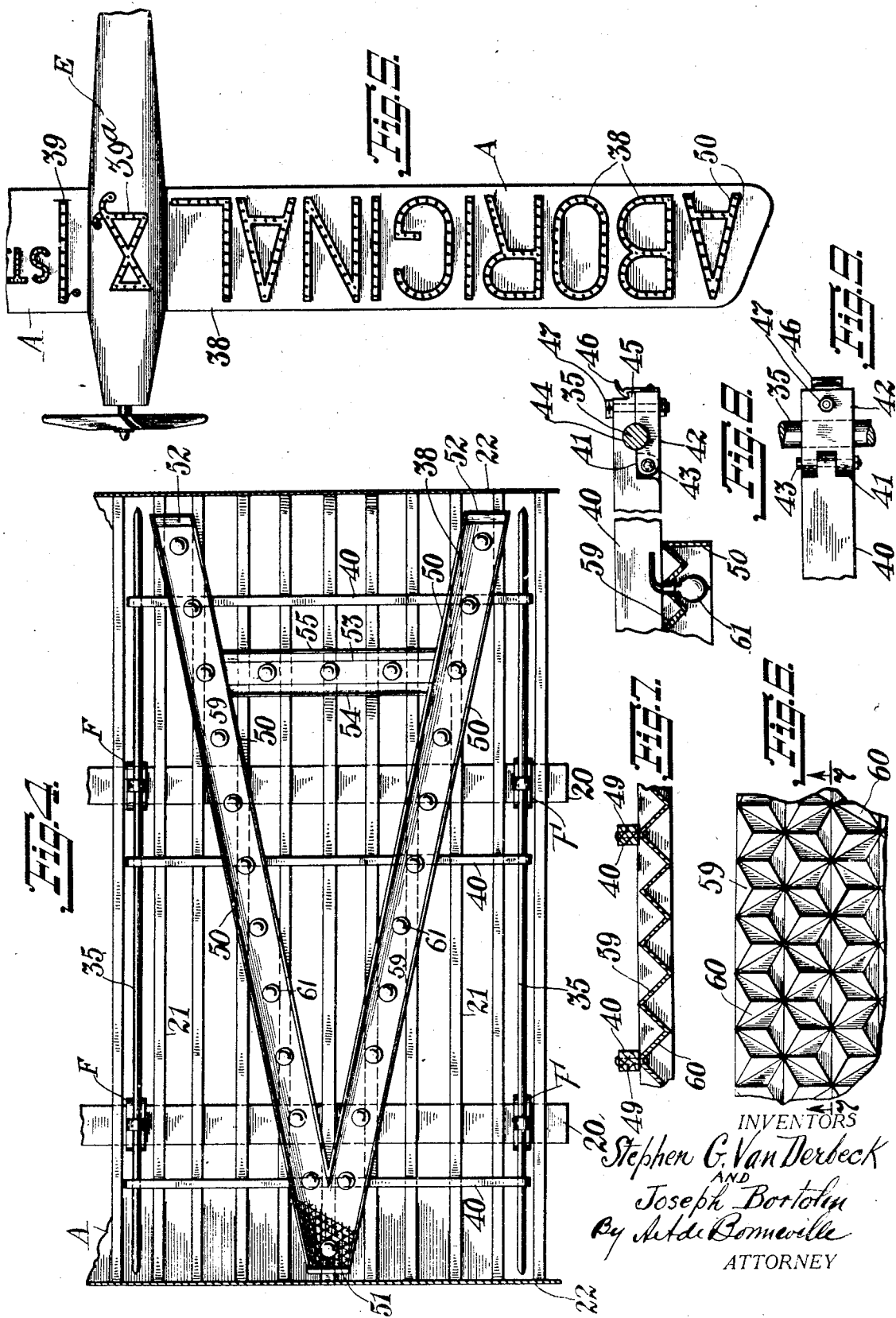

Patented June 21, 1927.

1,633,540

UNITED STATES PATENT OFFICE.

STEPHEN G. VAN DERBECK, OF HACKENSACK, NEW JERSEY, AND JOSEPH BORTOLIN, OF BROOKLYN, NEW YORK, ASSIGNORS OF ONE-THIRD TO WALDO R. BLACKWELL, OF BROOKLYN, NEW YORK; FREDERICK LAMPE EXECUTOR OF SAID WALDO R. BLACKWELL, DECEASED.

AERIAL ILLUMINATING DEVICE.

Application filed July 31, 1923. Serial No. 654,846.

The object of this invention is the production of an aerial illuminating device. Its specific object is the production of aerial illuminated letters or numerals and the like, which are detachably connected to the wing or wings or body of an aeroplane, and form indicating elements, signs or legends for advertisements, signals, amusements and for various other purposes.

The organization of the invention comprises letters, numerals and the like which are detachably connected to one or both of the wings or body of an aeroplane preferably the lower wings. The members of the letters are preferably channel shaped in cross section, and the body of each comprises a plurality of pyramids with pyramidal reflecting surfaces, to reflect the light rays of electric light bulbs that extend from the body of the letter. Each letter at its forward end has formed therewith a turned in nose to hold the light rays, within the contour of the letter and prevent dust and other foreign matter settling on the face of the letter. The end of each letter is provided with a cross apron to permit dust and the air to easily glide therefrom. The cross members of each letter or numeral are also preferably provided with similar noses and cross aprons. The electric light bulbs are in electric circuit with a rotating switch, so that the time of illumination of each letter can be predetermined. The bases of the pyramids are in the same plane and the apexes thereof are in the same plane. The said apexes are adjacent to the outer sides of the letters.

In the accompanying drawings Fig. 1 represents a partial side elevation of an aeroplane with a cross section through one of its wings; Fig. 2 shows an enlarged fragmentary portion of Fig. 1; Fig. 3 indicates an enlarged rotating switch with electric light bulbs and the wiring therefor; Fig. 4 represents a bottom plan view of a fragmentary portion of an aeroplane wing with the covering thereof removed and a bottom plan view of a letter with its appurtenances; Fig. 5 shows a bottom plan view of a portion of an aeroplane with its wings and body, with an illuminated sign connected thereto; Fig. 6 indicates an enlarged bottom plan view of a portion of a letter; Fig. 7 is a section of Fig. 6 on the line 7, 7; Fig. 8 shows an enlarged section of Fig. 1 on the line 8, 8 and Fig. 9 is a partial bottom plan view of Fig. 8.

An aeroplane is indicated with the lower wings, each designated in its entirety by the letter A, an upper wing B, wing posts C, the landing gear D and the body E.

The wing A comprises the longitudinal wing beams 20, that are connected by the cross members 21. The latter have connected thereto the usual covering 22, which is provided with the small cover pieces 23 over openings 24 in the covering.

A plurality of pairs of hangers each designated in its entirety by the letter F are suspended from the wing beams 20. Each hanger comprises the vertical parallel members 28, which at their upper ends terminate in the jaws 29, that are connected by the clamping bolt 30, by means of which the hanger is tightly clamped to the beam 20. A horizontal member 31 connects the vertical members 28 and has extending therefrom the eye 32.

A supporting rod or tube 35 extends through each pair of said hangers F and is locked in place by a pin 36.

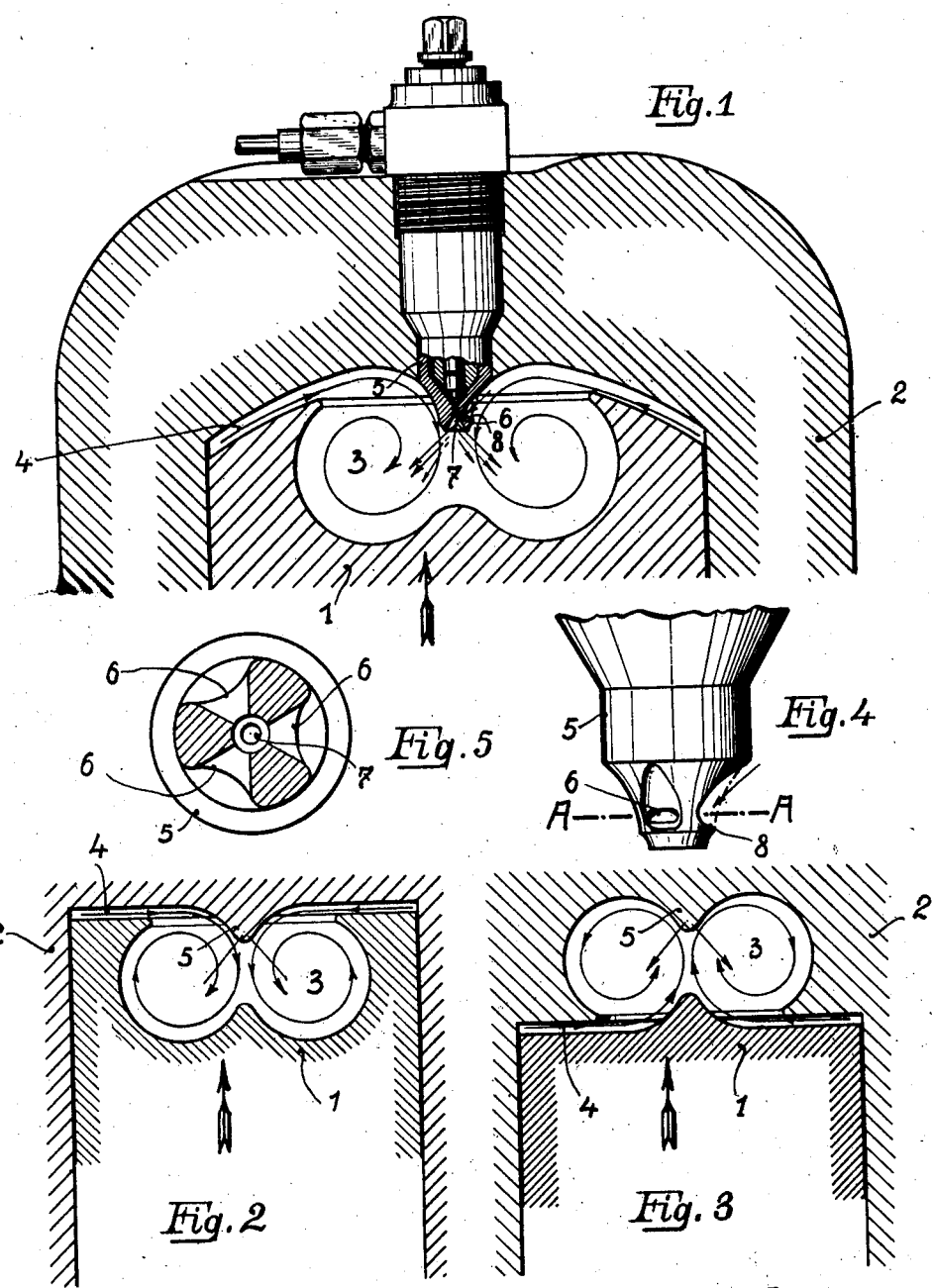

Illuminated letters each designated in its entirety by the numeral 38, are detachably connected to the supporting rods 35. Illuminated numerals 39 may also be supported by the rods 35, and numerals or letters 39$^a$ may be supported from rods 35 extending from the lower face of the body E. Each letter comprises the cross girders 40, each of which at its opposite ends is recessed at 41 and has a cap 42 hinged thereto, by means of a hinge pin 43. Circular bearing surfaces 44 are respectively formed in the ends of the cross girders and the caps for the supporting rods 35. A latch projection 45 is formed at the opposite ends of each of the girders 40, and a latch spring 46 has one end fastened to each of the caps 42, by means of which latter the caps are locked to the said girders, to clamp said girders 40 to the rods 35. Bolts 47 also extend through the ends of the girders 40 and the caps 42 to hold the caps in place. The letters proper 38 in this instance, are fastened to the girders 40, by means of rivets 49, although any other suitable fastening means may be employed.